(12) United States Patent
Zelinka et al.

(10) Patent No.: US 8,340,423 B1
(45) Date of Patent: Dec. 25, 2012

(54) ENHANCING DIGITAL IMAGE MOSAICS USING REGION-STATISTICS

(75) Inventors: Stephen D. Zelinka, Los Gatos, CA (US); Paul S. Heckbert, Edgewood, PA (US)

(73) Assignee: Google Inc., Mountain View, CA (US)

( * ) Notice: Subject to any disclaimer, the term of this patent is extended or adjusted under 35 U.S.C. 154(b) by 655 days.

(21) Appl. No.: 12/585,944

(22) Filed: Sep. 29, 2009

(51) Int. Cl.
*G06K 9/00* (2006.01)
(52) U.S. Cl. ...................................... 382/173
(58) Field of Classification Search .................. 382/173
See application file for complete search history.

(56) References Cited

U.S. PATENT DOCUMENTS

| | | | | |
|---|---|---|---|---|
| 6,137,498 A | * | 10/2000 | Silvers | 345/629 |
| 6,307,566 B1 | * | 10/2001 | Hill et al. | 345/613 |
| 7,916,940 B2 | * | 3/2011 | Hel-Or | 382/167 |

OTHER PUBLICATIONS

Tanner et al., "The Clipmap: A Virtual Mipmap", SIGGRAPH '98 Proc. Conference on Computer Graphics and Interactive Techniques, 1998, ACM, pp. 151-158.

Agarwala et a., "Interactive Digital Photomontage", SIGGRAPH '04, ACM SIGGRAPH 2004 Papers, 2004, ACM, pp. 294-302.

* cited by examiner

*Primary Examiner* — Vikkram Bali
(74) *Attorney, Agent, or Firm* — Sterne, Kessler, Goldstein & Fox P.L.L.C.

(57) ABSTRACT

Methods and systems for updating mosaics of digital source images are disclosed. According to one embodiment, a method for updating a mosaic of digital source images includes segmenting the mosaic to regions, generating a plurality of region-statistics where each region-statistics correspond to image characteristics of one region, organizing the plurality of region-statistics in a database, and updating the mosaic using at least one target region-statistics from the organized plurality of region-statistics. Updating the mosaic can include color correcting. The method for updating a mosaic of digital source images can also includes optimizing the organized plurality of region-statistics, wherein the optimizing is based on one or more reference region-statistics from the organized plurality of region-statistics.

20 Claims, 9 Drawing Sheets
(2 of 9 Drawing Sheet(s) Filed in Color)

ENHANCING DIGITAL IMAGE MOSAICS USING REGION-STATISTICS

BACKGROUND

1. Technical Field

The present invention generally relates to processing digital imagery.

2. Background Art

Mosaics of digital images are created, among other reasons, to form substantially continuous views of landscape, terrain, sky, or other scenery. Individual digital images are processed and blended with each other to form the mosaic.

Ideally, the blended images appear seamless and the blending should not be apparent to the human eye. However, it is often the case that a mosaic contains blend artifacts, such as misaligned edges, different lighting, and/or different color compositions in adjacent blended images. Blend artifacts can, for example, cause a patchwork-like effect to be visible when the overall color tones of different images vary significantly.

The reduction of color differences among adjacent blended images can noticeably improve the viewing quality of the mosaic. However, conventional methods appear inadequate for color correcting large and/or dynamic mosaics. Conventional methods for correcting color differences, for example, rely on a reference image that is created with substantial manual effort from an original source image. The reference image is then used, with a technique such as color histogram matching, to color-correct images and/or areas of a mosaic to be corrected. Any updates to a source image can require the reference image to be updated again with substantial manual effort. Therefore, the relatively high levels of manual effort, for example, to generate reference images, and substantial dependence on source images and/or reference images, render conventional approaches unsuitable for applications involving large and/or dynamic mosaics.

In many instances, mosaics are large and are created from numerous source images. For example, Google Earth creates a mosaic representing the Earth having a large number of images. The source images used for the mosaic can change frequently as new images are acquired. Therefore, new methods and systems are needed for updating large and/or dynamic mosaics.

SUMMARY

Methods and systems for updating mosaics of digital source images are presented. According to one embodiment, a method for updating a mosaic of digital source images includes segmenting the mosaic to regions, generating a plurality of region-statistics where each region-statistics correspond to image characteristics of a respective region, organizing the plurality of region-statistics in a database, and updating the mosaic using at least one target region-statistics from the organized plurality of region-statistics. Updating the mosaic can include color correcting. The method for updating a mosaic of digital source images can also includes optimizing the organized plurality of region-statistics, wherein the optimizing is based on one or more reference region-statistics from the organized plurality of region-statistics.

Another embodiment is a system for updating a mosaic of digital images that includes at least one processor, a memory, and a region-statistics module coupled to the memory and the at least one processor. The region-statistics module includes a scene segmenter configured to segment the mosaic to regions, a statistics collector configured to generate a plurality of region-statistics, wherein each region-statistics correspond to image characteristics of one said region, and a statistics organizer configured to organize the plurality of region-statistics in a database. The region-statistics module can further include a statistics optimizer to optimize the organized plurality of region-statistics based on one or more reference region-statistics from the organized plurality of region-statistics.

Yet another embodiment is a computer program product including a computer readable medium having computer program logic recorded thereon for causing at least one processor to segment a mosaic of digital source images to regions, to generate a plurality of region-statistics where each region-statistics correspond to image characteristics of one said region, and to organize the plurality of region-statistics in a database. The computer program logic can further cause the processor to optimize the organized plurality of region-statistics based on one or more reference region-statistics from the organized plurality of region-statistics.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The patent or application file contains at least one drawing executed in color. Copies of this patent or patent application publication with color drawing(s) will be provided by the Office upon request and payment of the necessary fee.

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

TABLE OF CONTENTS

Overview
System having a database of global image statistics
Building and using a global database of image statistics
Optimizing region-statistics
Applying color-correction to a mosaic
Conclusion

DETAILED DESCRIPTION

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Overview

The present invention includes methods and systems for enhancing the appearance of digital images and mosaics of digital images. Embodiments of the present invention are herein described primarily with respect to correcting color differences such as color tone, brightness, contrast, and the like. However, persons skilled in the art would appreciate that the methods and systems described herein can be applied to correcting other spatially variant aspects of images or mosaics. For example, height of geographic areas in an elevation mosaic may be corrected to alleviate discontinuities inherent in the acquisition of such images.

A "mosaic," as used herein, refers to an image created by blending and/or merging multiple digital source images. In one embodiment, a mosaic of a surface of the Earth can be generated by blending and/or merging numerous aerial images. The images used in the mosaic may be digital imagery capturing the surface of the Earth from a variety of elevations. The mosaic can be a multi-resolution mosaic where images of multiple resolutions can be blended and/or merged together to create the mosaic. For example, a view in which the Earth is displayed to a user can comprise of images of a single resolution. As the user gradually focuses or zooms in on a particular area, the geographic area covered by the subsequent scenes are reduced, and images of increasing resolution can be displayed. In general, what is displayed to a user is a mosaic that blends images of the highest available resolution for the area displayed. In this example, the multi-resolution mosaic includes images used to display the Earth at any zoom level. Google Earth from Google, Inc. presents such a multi-resolution mosaic of the Earth. Mosaics can also incorporate multiple dimensions, such as, three dimensional views.

Embodiments of the present invention enable the blending and color-correcting of mosaics in a scaleable and flexible manner. Advantages of embodiments of the present invention are more pronounced when used in relation to large mosaics (i.e., mosaic created from a large number of source images) and/or mosaics that are frequently updated because of changing source images. For example, an embodiment of the present invention creates a database of image statistics in which local statistics related to the appearance of each area (or region as defined below) of the mosaic is maintained. The image statistics can include statistics that define color characteristics. The image statistics for each area, after the initial collection, are substantially independent of the source images based on which they were collected. Therefore, the statistics for areas can be manipulated to efficiently yield numerous visual improvements in the mosaics, for example, yielding global color consistency across the mosaic. Another advantage of the present invention is that a seamless continuously zoomable mosaic is created that preserves frequency content. The ability to preserve frequency content, using, for example, multi-resolution image pyramids, yields imagery which are substantially free of artifacts such as grey blobs at coarse levels and loss of detail at fine levels.

System Having a Database of Global Image Statistics

Figure 1:
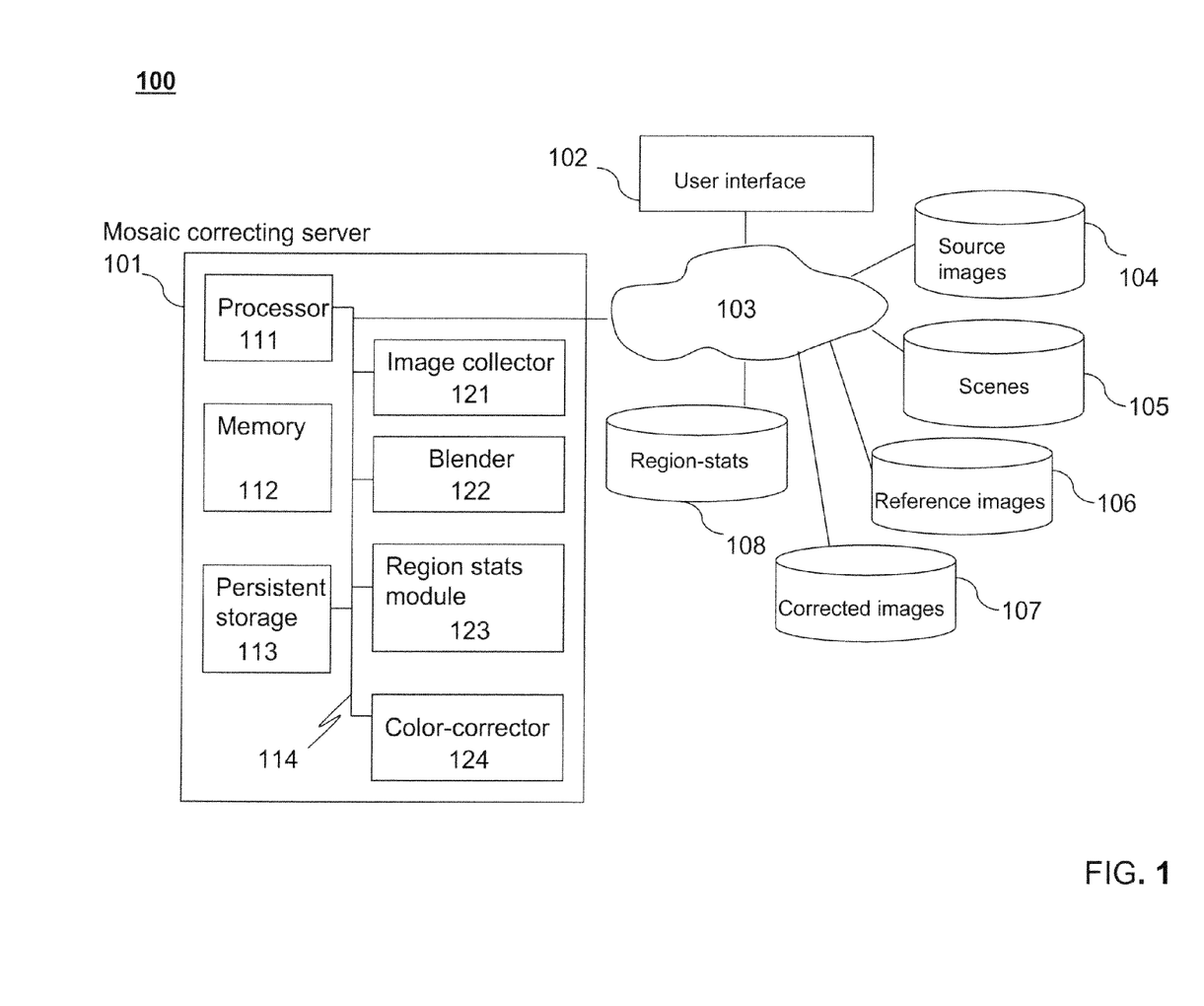
FIG. 1 is a system having a database of reference color statistics, according to an embodiment of the present invention.

FIG. 1 shows a system 100, according to an embodiment of the present invention. System 100 comprises at least one mosaic correcting server 101, at least one user interface 102, at least one network 103, and one or more databases 104-108. Server 101 typically includes at least one server computer. Example server computers include but are not limited to, a computer, workstation, distributed computing system, computer cluster, embedded system, stand-alone electronic device, networked device, mobile device (e.g. mobile phone or mobile computing device), rack server, set-top box, or other type of computer system having at least one processor, memory, and network interface. Server 101 can include at least one processor 111, at least one memory 112, at least one persistent storage 113, at least one communication bus 114, and one or more processing modules, including an image collector 121, a blender 122, a region-statistics module 123, and a color corrector 124.

Processor 111 comprises one or more processors, such as control processor units (CPU), graphics processor units (GPU), field programmable gate arrays (FPGA), digital signal processors (DSP), application specific integrated circuits (ASICS), or any other general or customized processors. Processor 111 includes the functionality to control the operation of server 101, for example, by executing the instruction logic of processing modules 121-124.

Memory 112 includes at least one non-persistent memory device, such as, for example, a dynamic random access memory (DRAM). Memory 112 can be used, for example, to store the instruction logic of one or modules 121-124 during execution of that logic.

Persistent storage 113 includes one or more storage devices capable of storing digital data such as magnetic disk, optical disk, or flash memory. Persistent storage 113 can, for example, store at least parts of instruction logic of modules 121-124.

Communication bus 114 can include a Peripheral Component Interconnect (PCI) bus, Advanced Microcontroller Bus Architecture (AMBA) bus, Industry Standard Architecture (ISA) bus, or such a device. Communication bus 114 can also include a network such as a local area network (LAN). Communication bus 114 includes the functionality to couple components including components of server 101.

User interface 102 includes one or more interfaces connecting user input/output devices such as keyboard, mouse, display and/or touch screen. For example, user input can be provided through a keyboard and mouse connected through network 103 (or communication bus 114) to server 101. The output of server 101, such as the processing output of modules 121-124, can be output to a display through user interface 102.

Network 103 includes one or more networks, such as the Internet. In some examples, network 103 can include one or more corporate wide area network (WAN) or local area network (LAN). One or more network technologies, such as, Ethernet, Fast Ethernet, Gigabit Ethernet, a variant of IEEE 802.11 such as WIFI, or PSTN, can be used.

Modules 121-124 include functionality for creating, maintaining, and using a database of image statistics that is configured to be used to correct images, according to embodiments of the present invention. Modules 121-124 can be implemented in software, firmware, hardware, or using a combination thereof. In one embodiment, the processing logic of one or more of modules 121-124 may be implemented using one or more programming languages and scripting languages such as C, C++, Java, HTML, XML, and JavaScript.

Image collector 121 includes functionality to receive, store, and update digital source images to be used in a mosaic. In one embodiment, image collector 121 can include the functionality to manage a database, such as source images database 104. For example, image collector 121 can access external image repositories to obtain source images and/or provide functionality for users to submit source images. The source images can then be stored in source images database 104.

Blender 122 includes functionality to digitally merge multiple source images into a mosaic. In one embodiment, blender 122 takes source images from source images database 104 as input and outputs a mosaic as output. The output mosaics can be stored in scenes database 105. Blender 122 can perform the blending or merging of multiple images based on characteristics of the images, such as, geographic coordinates, timestamps, image author, and identified objects within the images. As would be clear to a person of ordinary skill in the art, blending can be based on one or a combination of approaches. For example, in one embodiment, images are blended based on a weighted averaging of corresponding pixels, where the weights vary from pixel to pixel, and in another embodiment images are blended using a graph-cut algorithm to select seams among images without any averaging of pixels.

Region-statistics module 123 includes functionality to generate region-statistics from images of a mosaic, and to store, update, and optimize such generated region-statistics. For example, region-statistics module 123 can take as input scenes from a mosaic, such as that stored in scenes database 105 and images from reference images database 106, and generate region-statistics that are stored in region-statistics database 108. The processing of region-statistics module 123, according to one embodiment of the present invention, is described in relation to FIGS. 3-4 below.

Color corrector 124 includes functionality to apply color correction to images of a mosaic and/or its constituent images. In one embodiment, color corrector 124 applies color correction to scenes and/or individual images of a mosaic from scenes database 105 based on region-statistics from region-statistics database 108. The color corrected individual images, for example, can be stored in corrected images database 107. The processing of color corrector 124, according to one embodiment of the present invention, is described in relation to FIG. 5 below.

The term "database" is used herein to refer to an organized collection of digital data, and is not limited to commercially-available database management systems and the like. Although shown in FIG. 1 as external to server 101, a person of skill in the art would understand that one or more of databases 104-108 can be implemented entirely within server 101. Alternatively, any of the databases 104-108 can comprise components that are both internal and external to server 101. For example, region-statistics module 123 in server 101 can include all or part of the functionality for organizing and/or managing region-statistics stored in a region-statistics database 108, where database 108 uses storage external to server 101. It should also be understood that databases 104-108 can be implemented as separate databases, or in combinations of two or more databases. For example, source images database 104, reference images database 106, and corrected images database 107, can be implemented as one database storing images, where each image is marked as source image, reference image, and/or corrected image.

Source images database 104 includes source images collected for the generation and/or update of one or more mosaics. In one embodiment, images collected using image collector 121 are stored in source images database 104. Digital images in source images database 104 can be organized according to one or more criteria such as, geographic coordinates, time stamps, image source, and one or more tag fields (e.g., names descriptive of image). For example, when system 100 is used in relation to a multi-resolution mosaic of a map of a geographic area, images in source images database 104 can include images received from one or more satellites and/or aerial image sources.

Scenes database 105 includes one or more mosaics, such as multi-resolution image mosaics that comprise multiple source images. For example, scenes database 105 can store a multi-resolution mosaic generated by blender 122 based on source images from source image database 104. A "scene" as used herein refers to a viewable or displayed instance of a mosaic. A scene in which the entire Earth is displayed to a user can comprise of images of a single resolution. As the user gradually focuses or zooms in on a particular area, the geographic area covered by the subsequent scenes are reduced, and images of increasing resolution can be displayed. In general, for any scene, a mosaic of the viewable area of a scene that blends images of the highest available resolution for that area is displayed. In this example, the multi-resolution mosaic comprises all of the images used to display the Earth at any zoom level. Mosaics can also incorporate multiple dimensions. For example, some scenes may include imagery in three dimensions.

Scenes database 105 can be organized in various ways. In one embodiment, scenes database 105 stores substantially all the digital images that are blended to create a multi-resolution mosaic. In another embodiment, scenes database 105 stores information related to the digital images that comprise a multi-resolution mosaic and parameters to be used for the blending and/or merging of the digital images, while allowing the digital images themselves to be stored in other databases, such as source image database 104, reference images database 106, or corrected images database 107.

Reference images database 106 includes digital images identified as having characteristics that can be used as reference characteristics to be used in correcting a mosaic and/or images associated with a mosaic. In one embodiment, each source image, such as an image in source images database 104, can be identified by a user as a "reference image," i.e., an image having characteristics that can be used as reference characteristics to be used in correcting a mosaic and/or images associated with a mosaic. For example, image collector 121 can enable a user who accesses the system through user interface 102, to selectively mark images as reference images. In another embodiment, an automated processing module, for example, a component of image collector 121, can process digital images in source images database 104 and select one or more images that include a set of desired characteristics. The set of desired characteristics can include predetermined characteristics and dynamically derived characteristics. For example, predetermined characteristics can include one or more absolute color levels, and dynamically derived characteristics can include one or more relative levels of color with respect to other images. In one feature, one or more reference images from reference images database 106 are included in a multi-resolution mosaic stored in scenes database 105.

Corrected images database 107 includes "corrected images," i.e., images that have been corrected using region-statistics according to an embodiment of the present invention. For example, one or more images comprising a part of multi-resolution mosaic can be stored in corrected images database 107 after having been processed by color corrector 124.

Region-statistics database 108 includes region-based image statistics generated according to embodiments of the present invention. For example, region-statistics database 108 can include image statistics for each of a plurality of regions of one or more mosaics in scenes database 105. Image statistics stored in region-statistics database 108 can include color statistics such as the standard deviation and/or mean of one or more color bands, measures of contrast and brightness, full color histograms, bidirectional reflectance distribution function measurements, and other information such as time or day and seasonal information for each set of color statistics. For each set of statistics, region-statistics database 108 can identify whether or not that set of statistics is a reference set of statistics that should preferably be used in color correction of mosaics and/or individual images. Some form of a reference region identification can be used to indicate that a region-statistics entry corresponds to a reference region. For example, region-statistics derived from images identified as reference images can be identified as "reference region-statistics," i.e., reference region-statistics that are preferably used in color correcting mosaics and/or individual images.

A "region," as used herein, is a unit of segmentation of a mosaic. For example, at a zoom level in which the entire area represented in a multi-resolution mosaic is viewable, the viewable area of the mosaic can be segmented into a plurality of regions. Regions can be of any shape or size, and one region may or may not overlap with another region. For ease of description, the following disclosure is based primarily on regions of substantially rectangular shape. In an example application of an embodiment of the present invention in which a multi-resolution mosaic of the Earth is generated, a region can be defined as the geographic area encompassed by latitude and longitude coordinates.

In one embodiment, region-statistics database 108 can be structured as a table data structure. Each row in the table can represent a region of the mosaic. Columns can be grouped into columns of reference region-statistics or columns of corrected region-statistics. Columns of reference region-statistics can include a set of columns for each statistic, such as a per color band standard deviation and per color band mean. Columns of corrected region-statistics can include a set of columns for each image, where the set of columns include subsets of columns for each statistic, such as a per color band standard deviation and per color band mean. For example, an image to which color correction is applied according to an embodiment of the present invention can have its statistics associated with each region that it overlaps listed in column for each respective region. Note that in some embodiments of the present invention, reference region-statistics are completely decoupled from the source images from which they were derived.

Figure 2:
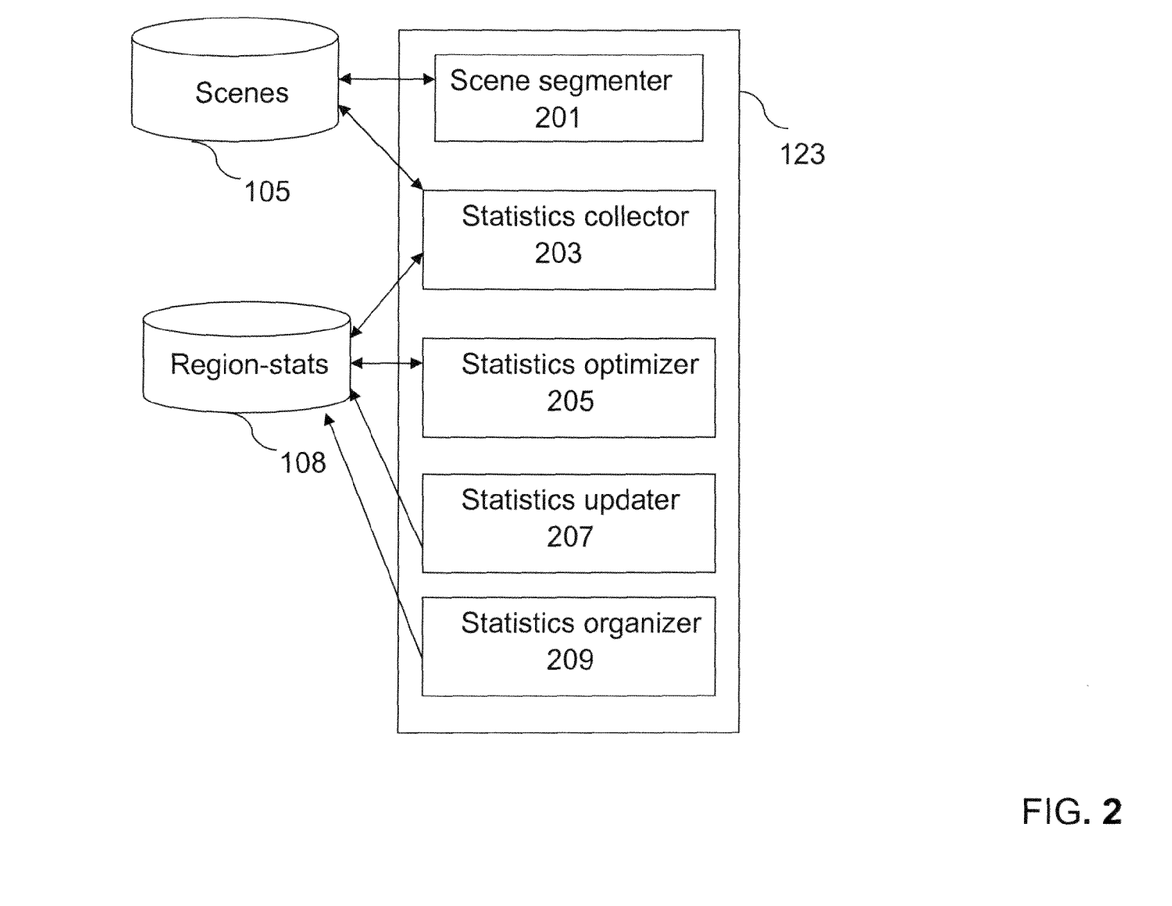
FIG. 2 illustrates modules for processing reference color statistics, according to an embodiment of the present invention.

FIG. 2 illustrates region-statistics module 123 in more detail. Region-statistic module 123, in one embodiment, can include a scene segmenter 201, a statistics collector 203, a statistics optimizer 205, a statistics updater 207, and a statistics organizer 209.

Scene segmenter 201 includes the functionality to segment a mosaic into regions. In one embodiment, a multi-resolution mosaic of the surface of the entire Earth is divided into regions, where a region is defined as the rectangular area between pairs of longitude and latitude lines. As noted above, other embodiments of the present invention can have regions that are of various shapes and/or sizes. Regions can also be defined based on information derived from a scene itself. For example, regions can encompass areas of substantially uniform characteristics, such as forest areas, desert areas, and the like. Scene segmenter 201 can, for example, take as input a scene of a multi-resolution mosaic stored in scenes database 105, and output the determined region definitions for that scene. Region definitions can themselves be stored along with the multi-resolution mosaic, for example, in scenes database 105. Region definitions can also be stored in region-statistics database 108.

Figure 3:
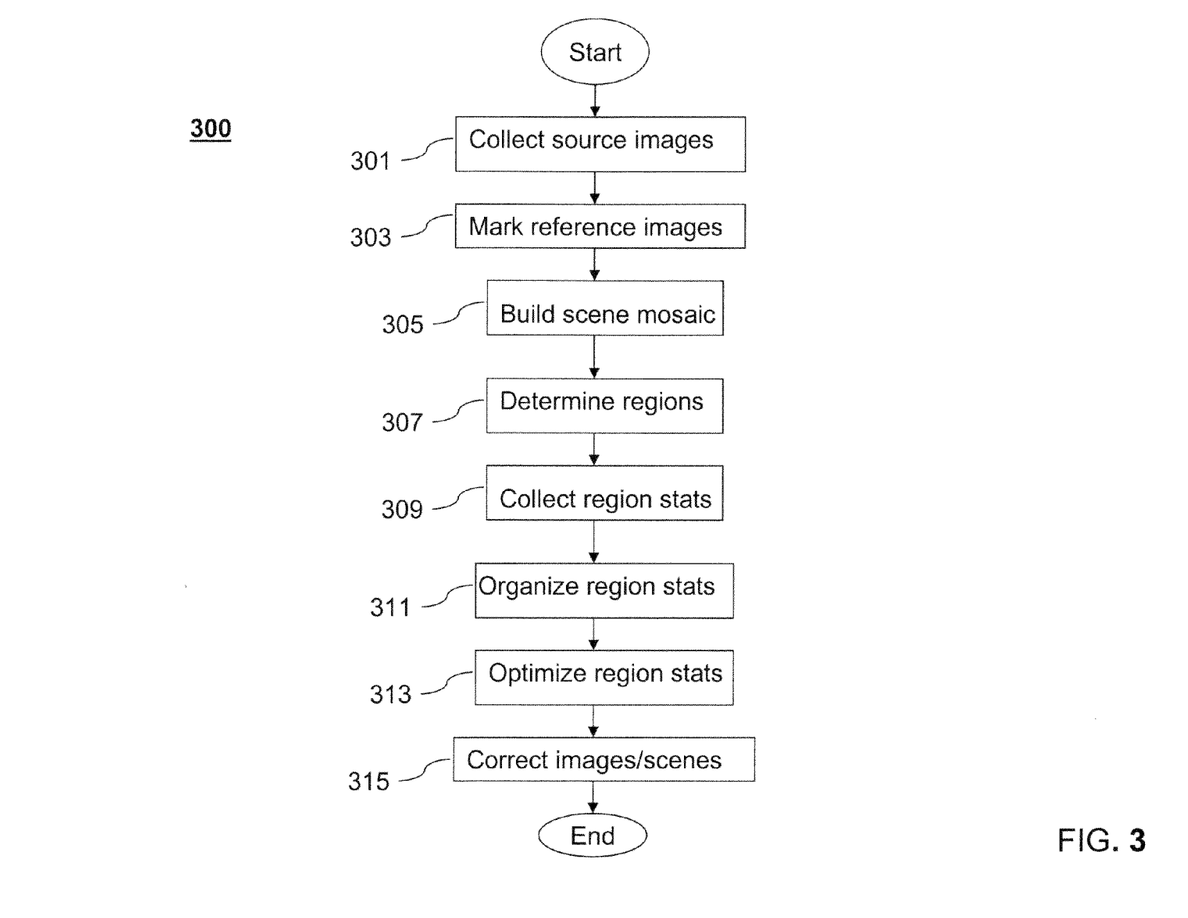
FIG. 3 illustrates a process to update mosaics of digital images using a database of color statistics, according to an embodiment of the present invention.

Statistics collector 203 includes functionality to determine image statistics for each region of a multi-resolution mosaic. For example, statistics collector 203 can calculate color statistics for each of a set of predetermined color bands. Color statistics for each color band can include a standard deviation and a mean calculated per region. In one embodiment, statistics collector 203 takes as input a scene of a multi-resolution mosaic stored in scenes database 105, and outputs the determined region-statistics for that scene to be stored in region-statistics database 108. Statistics collection, according to an embodiment of the present invention, is described below in relation to step 309 of process 300.

Statistics optimizer 205 includes functionality to optimize region-statistics, such as region-statistics stored in region-statistics database 108 in relation to a multi-resolution mosaic from scenes database 105. Statistics optimizer 205 can, for example, use filters to identify sets of region-statistics with predetermined features and that can be applied to other regions. Statistics optimizer 205 can also use extrapolation, for example, to improve the region-statistics (and therefore image characteristics) of regions that have less than desirable image characteristics. In some embodiments, statistics optimizer 205 can work substantially exclusively with region-statistics stored in region-statistics database 108. The optimization of region-statistics, according to an embodiment of the present invention, is described below in relation to step 313 of process 300.

Statistics updater 207 includes functionality to update region-statistics such as region-statistics stored in region-statistics database 108. In one embodiment, statistics updater 207 re-calculates region-statistics for each affected region when a new source image is added to a multi-resolution mosaic. Statistics updater 207 can also re-calculate region-statistics for reference regions when a new source image is designated as a reference image. A "reference region," is a region that overlaps one or more images designated as reference (i.e., reference images). A reference region can also be defined as a region that has at least a predetermined percentage of its area overlapped by images designated as reference. The updating of region-statistics, according to an embodiment of the present invention, is described below in relation to step 309 of process 300.

Statistics organizer 209 includes functionality to organize and/or manage the region-statistics database 108. For example, statistics organizer 209 provides the interface through which other modules interact with region-statistics database 108. In an embodiment, statistics organizer 209 can also provide the functionality to maintain consistency of region-statistics database 108 in situations where source images affecting multiple regions are added to or deleted from a multi-resolution mosaic. The storage and organization of region-statistics, according to one embodiment, is described below in relation to step 311 of process 300.

Building and Using a Global Database of Image Statistics

FIG. 3 illustrates a process 300 to correct mosaics and/or images using region-statistics, according to an embodiment of the present invention (steps 301-315). For ease of description, the discussion with respect to process 300 is based on a multi-resolution mosaic of the Earth, such as that available in the Google Earth product from Google, Inc., of California. It should be noted however, that the teachings herein can be applied to mosaics created from a variety of images, such as, but not limited to, mosaics of images of the sky, mosaics of images of other planets, mosaics of panoramic images of the inside or outside of buildings, and the like.

In step 301, images are collected. Source images of a variety of views of the Earth can be obtained from a variety of sources, such as, but not limited to, satellites, aircraft and other such high-altitude vehicles. Source images can also include images taken from a ground-based structure of substantial elevation such as a mountain or a building. In some embodiments, source images include images taken at ground-level, for example, to form a panoramic view of an area, such as those available in the Google Street View product, also from Google, Inc. Source images can be from a variety of sources, and taken at a variety of periods and times of day. Source images are also, in general, taken at a variety of resolutions. Source images can be received from publicly accessible digital image repositories, commercially available digital image services, and through individual user contribution. In one embodiment, image collection is performed by the image collector 121 described above. Source images can then be stored, for example, in source images database 104.

In step 303, reference images are identified. In one embodiment, reference images are identified by a user who views the source images. In another embodiment, reference images are identified by an automated process that processes each source image to detect if a set of predetermined image characteristics are present. For example, image collector 121 or the blender 122 can include functionality to identify source images as reference, either based on user input or automatic evaluation of the source images using a predetermined set of image characteristics. The criteria for identifying a source image as a reference image may vary according to many factors, such as, but not limited to, type of application, the season or time-of-day, cloud cover, haze, contrast, or age of image. The criteria can also include less objective criteria such as relative quality of the source images, or user perception. It should be noted that, in some embodiments, not all of a given source image would be used for reference. For example, a user or process may specify that a portion covered by clouds in a given source image is not to be used.

In step 305, a mosaic is generated from the source images. The mosaic can be a multi-resolution mosaic where it includes images having a variety of resolutions. For example, in Google Earth, at zoom-level 0 the entire Earth can be visible. A user can select a higher zoom-level to focus in on a particular area, such as a city. At the higher zoom-levels, the area visible to the user can become limited. At each zoom-level, in general, the images with the highest resolution can be displayed to the user.

The creation of the mosaic can be performed by blender 122. Blender 122 can blend or merge together available source images at a variety of resolutions to generate a mosaic of images at each resolution level. In one embodiment, although images covering the surface area of the entire Earth are available at zoom level 0, only portions of the surface area is covered by higher resolution images at higher zoom levels. The blending process can also include building a collection images at different resolutions for selected areas of the mosaic. Such a pyramid of images for selected areas can be used when a user focuses in on an area. Building a pyramid of images can also include images of higher/lower resolution created from already available images for an area. As noted above, the blending and/or merging of images to form part of the mosaic can be based on various factors including geographic coordinates, image source, season and time-of-day of image origination, image contents, and the like. Also, in creating the mosaic, preference can be given to blending and/or merging source images that have been identified as reference images.

In step 307, regions are determined for the mosaic, for example, using scene segmenter 201. Although the regions discussed herein are primarily of rectangular shape, as noted above, regions can be of any size or shape. Also, as noted above, regions can be defined in such ways as to increase the homogeneity of characteristics within each region, for example, by having separate regions for a forest area and for an urban area. Regions are used as the unit for calculating image statistics and for interpolating the update characteristics, according to embodiments of the present invention. Interpolation and image correction are described below in relation to steps 313 and 315.

In step 309, region-statistics are collected. Region-statistics can be collected for each of one or more of the regions, such as regions determined in step 307 above. Region-statistics can include, but are not limited to, color statistics, contrast, brightness, and the like. Color statistics can include, but are not limited to, standard deviation and mean for each color band, for example, red, green, and blue color bands. Color statistics for each color band can be derived from, for example, histograms of color distribution. Some embodiments can collect and store substantially all of the color distribution histogram data. In some embodiments, the region-statistics for a region can also include statistics descriptive of the content or objects within that region. For example, where the mosaic generated in step 305 is of a geographic area, statistics can include elements such as, the extent of foliage, extent of water, ground elevation, classification via spectrum and its spatial texture into ground cover, plant species, chemical composition, and the like. Statistics that are descriptive of the content of the region can be utilized in, for example, extrapolating statistics from one region to another.

In general, it is preferable that region-statistics are collected at a uniform resolution. In one embodiment, the region-statistics are collected at the coarsest level (e.g., the lowest zoom level) at which most reference images are available. In another embodiment, the region-statistics are collected at a zoom level at which each region is a tile. A tile is a unit used for extracting and/or processing parts of a mosaic. Tiles are described below with respect to FIG. 6. In collecting region-statistics, a process, such as a process in statistics collector 203, can iterate over each region. For each region a histogram can be generated for a selected set of color bands, such as Red, Green, and Blue. Then statistics, such as mean and standard deviation can be derived for each color band in each region. Depending on implementation, there can be one or more regions that do not have region-statistics because, for example, insufficient source images were available for those regions.

In step 311, the region-statistics generated and/or collected in step 309 are organized in a region-statistics database 108. The statistics, including region-statistics database 108, can be stored in a persistent digital data storage device, such as, persistent storage device 113 and/or another storage device external to server 101. Step 311 can also include organizing the region-statistics such that fast and efficient access to statistics is facilitated. For example, in step 311, statistics organizer 209 can be used to create and maintain a database table structure that allows efficient access to reference region-statistics as well as corrected region-statistics. An example table structure in which each region can be stored as a row was described above. Step 311 can also involve a database management system to store and organize region-statistics.

In step 313, optionally, region-statistics are optimized. For example, region-statistics stored in region-statistics database 108 can be processed and optimized such that the statistics are more consistent across an entire mosaic. An example region-statistics optimizing process 313 is described in relation to FIG. 4 below. Subsequent to the processing of step 313, the optimized region-statistics are stored, for example, in region-statistics database 108.

In step 315, the region-statistics are used to correct one or more scenes and/or images of a mosaic. In one embodiment where a multi-resolution mosaic of the Earth is being processed for color correction, a region overlapping a part of India, for example, can be color corrected using region-statistics from one or more surrounding regions. In another embodiment, a high resolution image of an area in the mosaic can be color-corrected while preserving its spatial detail using region-statistics for the regions that overlap the image. The region-statistics used for correction may be derived from images having a lower resolution but more desirable color characteristics. By having a global database of region-based image statistics, embodiments of the present invention allow a more scalable, more flexible, and more automated method of color correcting a large mosaic. Color correction, according to one embodiment of the present invention, is described below in relation to FIG. 5.

Optimizing Region-Statistics

Figure 4:
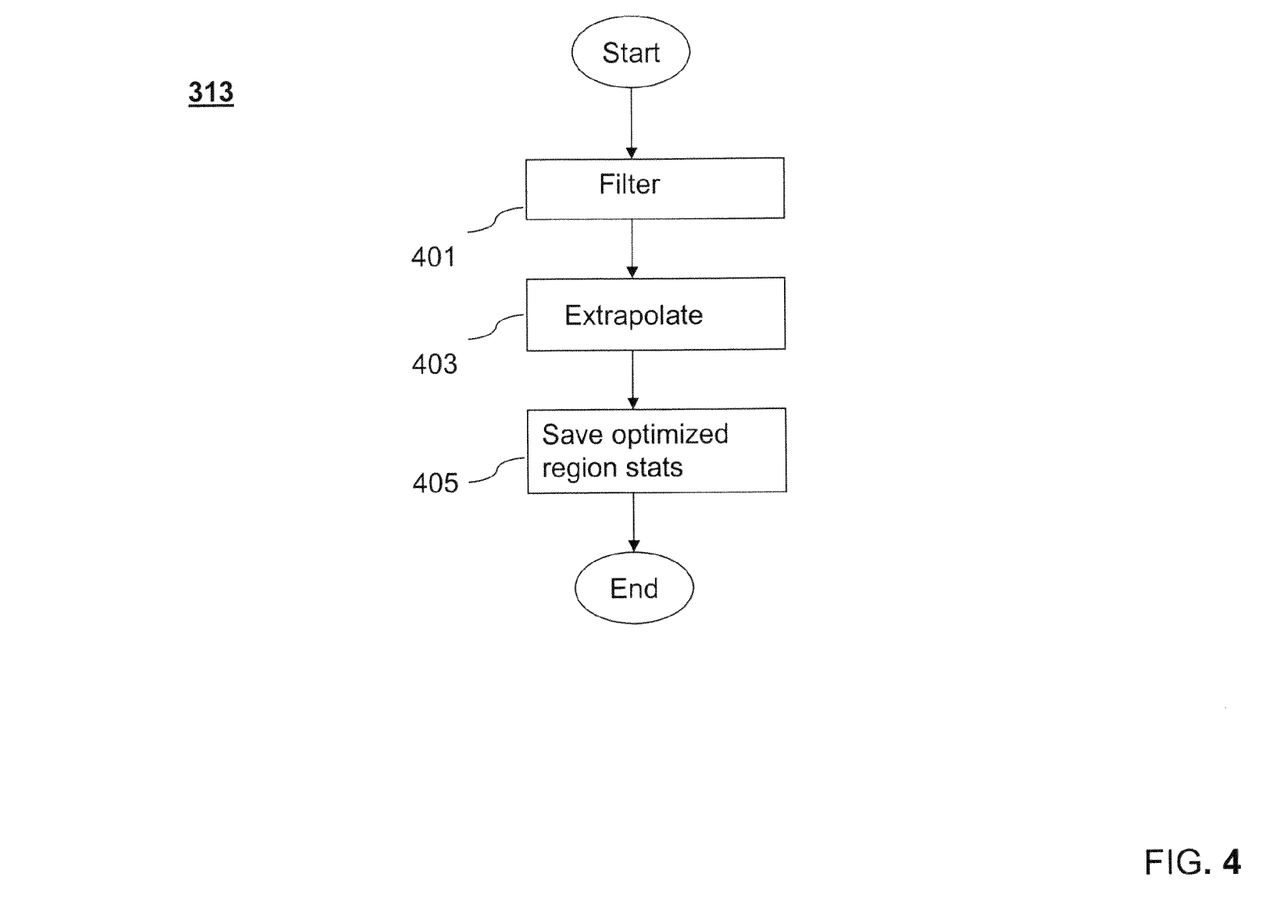
FIG. 4 illustrates a process to optimize a database of color statistics, according to an embodiment of the present invention.

Process 315, illustrated in FIG. 4, shows the processing steps involved in optimizing region-statistics, according to an embodiment of the present invention. Optimizing region-statistics database 108, for example, can involve one or more filtering steps and one or more extrapolation steps. Region-statistics database 108 effectively decouples the source images, including reference images and corrected images, from the statistics themselves. For example, the region-statistics for a reference region, once collected, are independent of the actual source reference images upon which those statistics were based. This is because that statistics, for example, color statistics of a reference region, is an expression of what the user expects that region to appear as. The decoupling of region-statistics from the source images enables substantial intra-region and inter-region optimization of statistics across one or more mosaics.

In step 401, one or more filters are applied to the region-statistics. In one example embodiment, region-statistics from one or more reference regions in region-statistics database 108 can be convolved in an arbitrary filter and the output used to either merge with or replace the statistics of another region. For example, given a filter size and one or more reference regions, the color statistics of reference regions can be sent to each neighboring region that are within filter-width. Each region can then aggregate and/or merge (for example, average or use to fill-in missing statistics) the reference regions' statistics with its own. Aggregating and/or merging can include, but is not limited to, averaging the local region-statistics and the statistics received from other regions, and using statistics received from other regions to fill-in any missing elements in the local region-statistics.

In another example, a filter, such as a box filter, can be used to fill holes in the statistics of reference regions. For example, if a reference region's statistics are marked as bad, a filter can be used to obtain only those statistics that are not marked as bad from that region. The bad statistics of a reference region can be selectively replaced with the statistics from another region with the use of such a filter. The filtering of region-statistics between neighboring regions also allows better blending of images where, for example, adequate statistics are unavailable for regions adjacent to the edges of an image. Having statistics filtered from neighboring regions can smooth color-corrected areas at the edges of an image in the mosaic where all regions required for the color-correcting interpolation function may not be available.

In step 403, statistics for one or more regions are extrapolated from other regions. For example, some regions may have no statistics or may have incomplete statistics. An extrapolation process can be used to provide replacement statistics for such regions with incomplete or non-existent statistics. In one example, a region for which region-statistics were not collected due to a lack of imagery can be extrapolated from the region-statistics of neighboring regions. For example, if an event such as the occurrence of cloud cover distorts statistics of one region, then the effected statistics for that region can be extrapolated from other regions that are considered to have similar image characteristics. In another example, reference statistics for a first region can be extrapolated from the reference statistics for a second region, where both regions have similar corrected statistics. In one embodiment, an extrapolation module can process the statistics for each region to detect regions having one or more of a predetermined set of undesirable image characteristics such as change in statistics caused by cloud cover of all or part of the region. The extrapolation module can also have a set of predetermined criteria by which it selects one or more regions from which statistics can be extrapolated to regions with undesirable image characteristics. In another embodiment, a user can identify regions having undesirable image characteristics and/or regions suitable to extrapolate statistics from.

The optimized region-statistics are used to update the region-statistics database 108 in step 405. Having optimized statistics can contribute to making the color correction process more efficient, and more effective. Optimization of region-statistics is enabled primarily due to the region-statistics database 108. Region-statistics database 108 can be considered as a global database, or global model, created from local image statistics. It should be noted that optimization is made possible by organizing and maintaining the region-statistics in a database such as database 108. On the other hand, if a set of reference images are sampled on an as needed basis when a correction is needed would allow no opportunity to globally optimize such statistics.

Applying Color-Correction to a Mosaic

Figure 5:
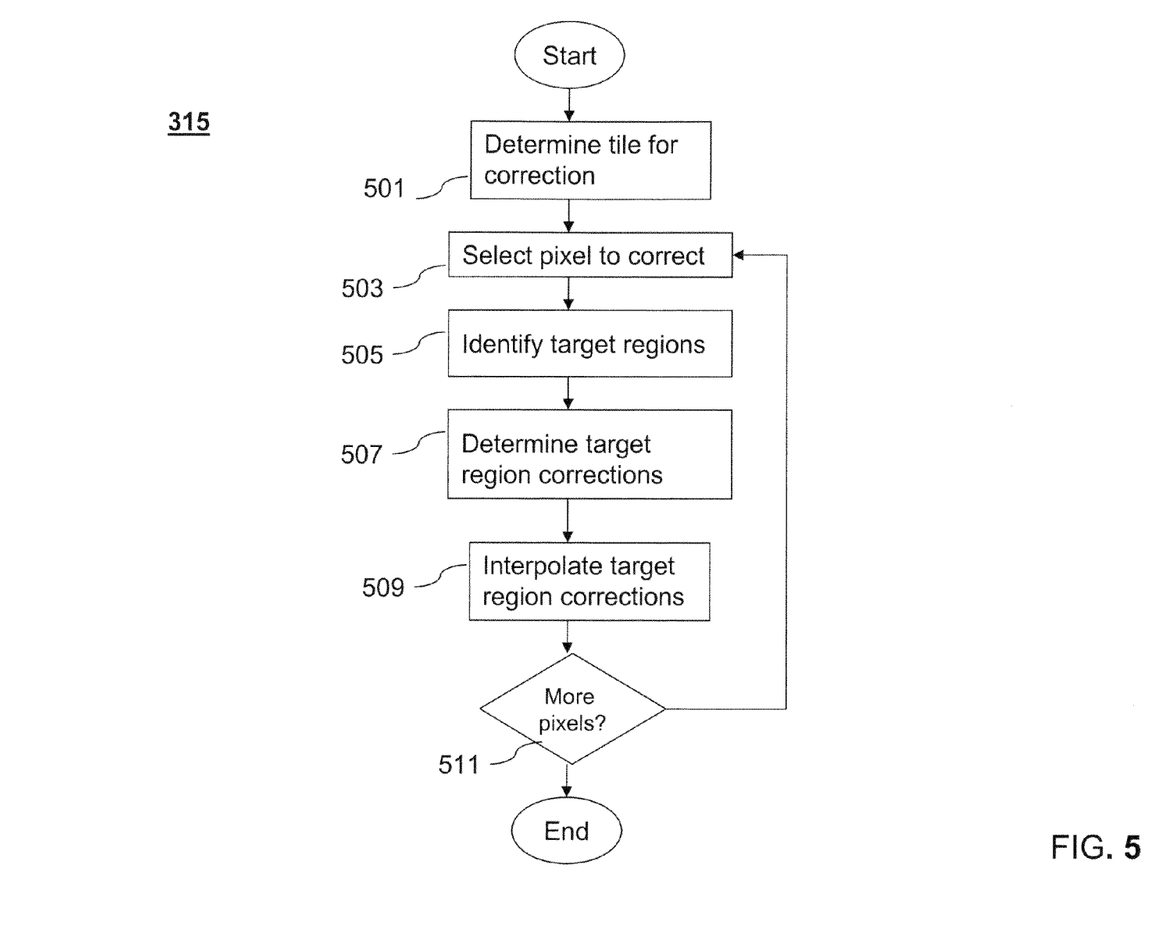
FIG. 5 illustrates a process for color correcting an image mosaic, according to an embodiment of the present invention.

FIG. 5 illustrates process 315 (steps 501-511) that color-corrects a mosaic, according to an embodiment of the present invention. Steps 501-511 can be applied to a mosaic of images either statically or dynamically. For example, in one embodiment, process 315 can be used to apply color-correction across the entire mosaic by pre-computing the color corrections before rendering the mosaic and/or images to the user. In another embodiment, process 315 can be used to dynamically color-correct each scene of the mosaic as the view is rendered to the user. In yet another embodiment, dynamic color-correction can be done for zoom levels higher than a predetermined threshold while lower zoom levels have the color corrections pre-computed.

Figure 6:
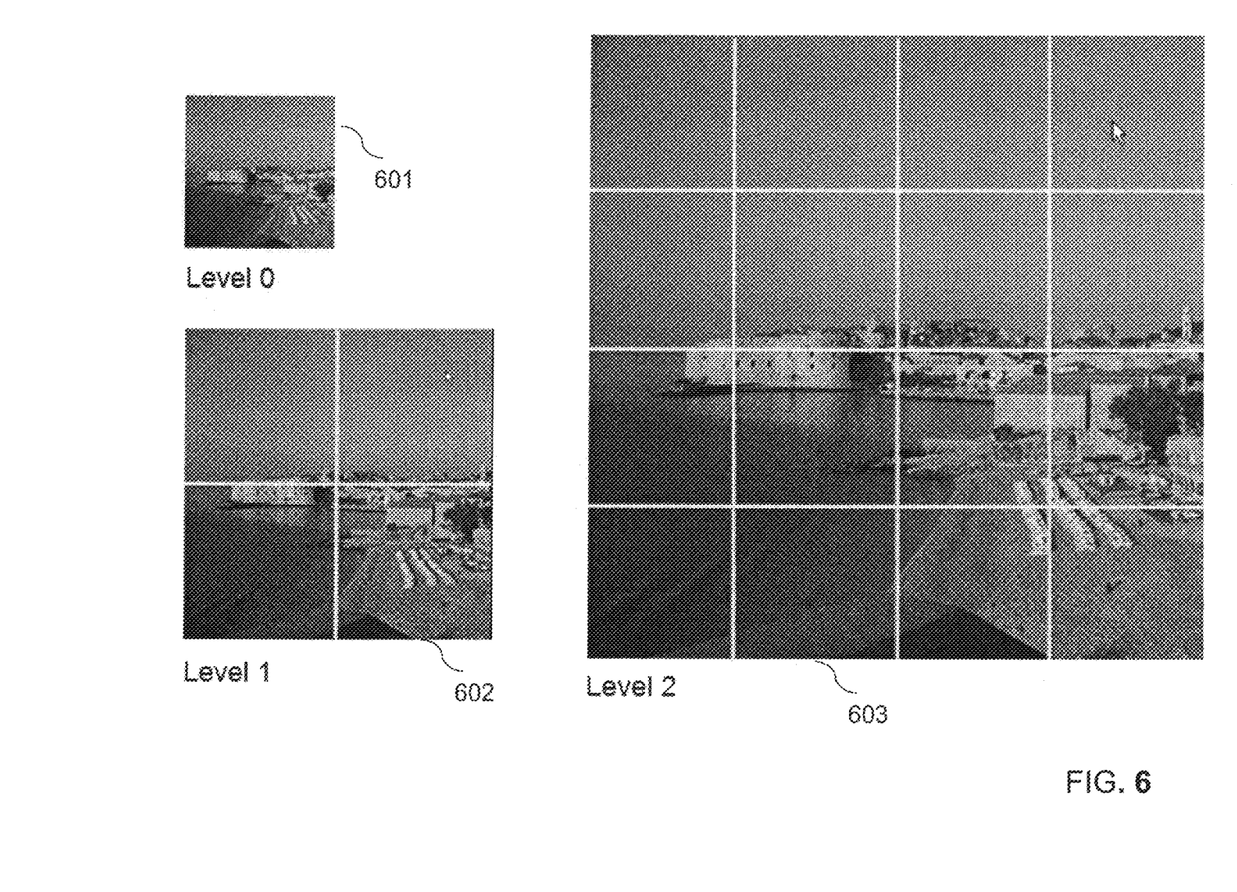
FIG. 6 illustrates an aspect of a multi-resolution image mosaic, according to an embodiment of the present invention.

As described above, a scene can include one or more tiles. FIG. 6 illustrates a relationship between scenes, tiles, and zoom level, according to an embodiment of the present invention. 601, 602, and 603 depict three instances of a scene from a multi-resolution mosaic. 601 is the scene at a zoom level of 0. 602 and 603 are the scene at zoom level of 1 and 2, respectively. It is generally the case that resolution increases with the zoom level. As noted previously, a tile is a unit used for extracting and/or processing parts of a mosaic. A tile is generally of fixed pixel dimensions. As the zoom level increases, the same ground area is covered by more tiles as shown in the increase in tiles going from 601-603. In one example, as a user moves from zoom level 0 to zoom level 3, and has only one tile area is visible, he may view 601, the lower right tile of 602, and the lower right tile of 603.

In step 501, a particular tile to which color correction is to be applied is identified. For example, a user or an automated process may have identified that a particular area or region in the mosaic requires color-correction. In one example embodiment, color correction may be dynamically applied to parts of a scene as those parts are presented to the user. In color-correcting an area or region, one embodiment of the present invention can proceed on a tile-by-tile basis. For example, steps 501-511 can be repeated for each tile included in the area that is to be color corrected.

In step 503, a pixel is selected to be corrected. The order of pixels within the tile selected in step 501 can be arbitrary. In one embodiment, pixels are selected in a left-right, top-bottom pattern in the tile. Steps 503-509 can be repeated for each tile to be corrected.

In step 505, the target regions, i.e., the regions based on which the pixel is to be corrected, are selected. In one embodiment, the four regions that are centered closest to the pixel to be corrected are selected as target regions. Other criteria for selecting regions based on which the pixel is to be corrected can include similarity in content to the region being corrected or manual selection. Similarity in content can be based on one or more metrics, such as, color similarity, texture similarity, and weather similarity. In yet another method, regions within an expanded area can be selected where each region within the expanded area is directly or indirectly connected to the region to be corrected through sufficiently similar regions. Sufficiently similar regions can be determined based on any similarity metric such as those noted above. A person of skill in the art would recognize that the selection of the interpolation function can be based, at least in part, on the number and/or distribution of the regions based on which the pixel is to be corrected. For example, bilinear interpolation, thin-plate splines, and/or radial basis functions, are some techniques that can be used for interpolating.

Figure 7:
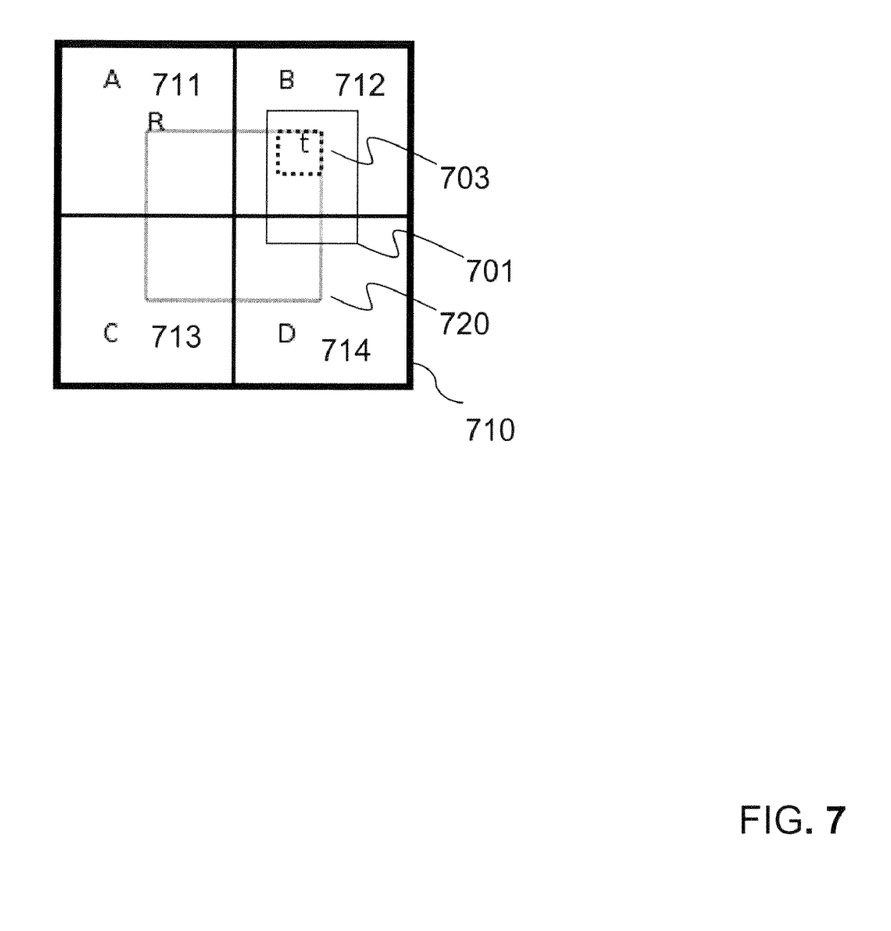
FIG. 7 illustrates aspects of color correcting, according to an embodiment of the present invention.

FIG. 7 illustrates an image 701 that is to be corrected, according to one embodiment. Image 701 overlaps regions B 712 and D 714 of a multi-resolution mosaic. Tile t 703 is the tile selected during an iteration of step 501. It can be that, for each pixel in tile t 703, the four regions centered closest to the pixel are regions A 711, B 712, C 713, and D 714. Also, it should be noted that for any pixel within area R 720, the set of target regions are the same.

Note that there can be regions with no available statistics at the time when region-statistics are collected, for example, in step 309. The optimization stage processing can be used (as described above in relation to step 313) to, for example, extrapolate statistics from neighboring regions for regions with no available statistics. Having statistics available for all or substantially all regions that may be needed for color-correction of affected regions can avoid the need for special processing (such as identity correction) in some regions.

In step 507, a correction based on each of the target regions is determined. In one embodiment, for each pixel to be color corrected, a correction value per color band is calculated based on a scaling factor and an offset that are applied to the corresponding statistic from the target region. When it is determined that color correction is needed, a color transform that preserves the detail of images while adjusting their colors can be applied. For example, color bands R, B, and G for a pixel can be adjusted with a calculation having the general form of:

$$r'=r_{scale}*r+r_{offset}$$

$$g'=g_{scale}*g+g_{offset}$$

$$b'=b_{scale}*b+b_{offset} \quad (1)$$

where (r, g, b) is the color of the original source image and/or region to be corrected, and (r', g', b') is the color after correction. The scale (e.g., $r_{scale}$, $g_{scale}$, $b_{scale}$) and offset (e.g., $r_{offset}$, $g_{offset}$, $b_{offset}$) can slowly vary across the area depicted by the mosaic and can be interpolated from the color statistics of the reference regions in that vicinity and also the statistics of the image or region to be corrected. The scale and offset are computed to match the mean and standard deviation of the corrected image or region to those of the reference region(s). In some embodiments, the statistics (e.g., the means and standard deviations for each color band) are calculated on a relatively coarse sampling of available regions for reasons of efficiency. Having calculated statistics for a coarse sampling of the regions, statistics for the other regions can be interpolated between regions. In an example embodiment, the corrections per-band can be clamped. In general, each color band can be clamped using the same or similar clamping factor in order to avoid undesirable variations in color. In another example embodiment, color-correction may not be based on separate per color band corrections: for example, a correction can be achieved by a rotation or other linear transform, or a rotation and scaling, of a pixel in a full three dimensional color space such as RGB. The three dimensional transforms implied by each selected region can then be appropriately interpolated to yield a correction.

In an embodiment, the correction for a pixel from a neighboring region, using histogram matching per color-band, can be computed based on (1) as following:

$$out=a+b*in \quad (2)$$

where b=target_region$_{sdev}$/source_region$_{sdev}$, a=target_region$_{mean}$−b*source_region$_{mean}$, in is the value of the input pixel (e.g., pixel to be corrected), and out is the value of the corrected pixel. target_region$_{sdev}$ and source_region$_{sdev}$ refer to the standard deviation of a color band of a target region based upon which to perform color-correction, and the standard deviation of a color band of the region being color-corrected, respectively. target_region$_{mean}$ and source_region$_{mean}$ refer to the standard deviation of a color band of a target region based upon which to perform color-correction, and the standard deviation of a color band of the region being color-corrected, respectively.

Applying a linear correction such as in (2) above using a database of statistics according to an embodiment of the present invention yields several desirable properties. For example, because the underlying statistics remain the same (e.g., region-statistics in the database), the imagery can be down sampled before or after the correction is applied. This is a highly useful property in correcting the coarsest level of a scene. If correction had to be applied subsequent to down sampling, correcting the coarsest level (e.g., level 0 where all of Earth is visible) would require computations using statistics of all regions. Calculations using statistics of all regions to correct one visible mosaic can be computationally prohibitive and can result in excessive delay in rendering the displayed mosaic. With the ability to correct and then down sample, the separate scenes of the mosaic at a higher (finer) level can be separately corrected and then minified to be used in the rendering of a coarser level. It should be noted that the process of correcting separate scenes at a finer level and also the process of minifying can be parallelized effectively. The interpolation too, can be applied either before or after correction, to yield the same end result. For example, interpolation may be based on a and b as in (3) below or on the value of out.

In step 509, the corrected value for the pixel is derived based on all or some of the regions of the set of target regions. In one embodiment, the corrections of the four target regions (e.g., the four regions with centers closest to the pixel to be corrected, as described above) are interpolated using bilinear interpolation:

$$\text{out}_{int} = \Sigma_{i \in [0,3]}(d_i*(a_i+b_i*\text{in})) \quad (3)$$

where $d_i$ is the bilinear interpolation factor for the $i^{th}$ region. For example, $\Sigma_{i \in [0,3]} d_i = 1$. a and b are as defined in (2) above. The bilinear interpolation factors for correcting tile t 703, for example, can be ¾ from region B 712, and 1/12 from regions A 711, C 713, and D 714. The bilinear interpolation factor can have the property that regions centered farther from the tile being corrected have less weight than regions centered closer to the tile being corrected. Note also that some forms of filtering can be applied to the interpolation, such as, for example, discounting regions that have statistics that are very different from nearby regions.

It should be noted that other methods of computing corrected pixel values based on statistics of adjacent regions are possible, and are contemplated within embodiments of the present invention. For example, the interpolating factors for each target region can be based on how close a target region is to some desired color level.

In step 511, it is determined whether more pixels to be corrected. If more pixels are to be corrected, steps 503-511 are repeated. As noted earlier, steps 501-513 are repeated for each tile of the area to be corrected. Other embodiments can involve interpolating the corrections for the corner pixels of a tile, and then interpolating the corrections for the intermediate pixels of that tile based on the corner pixels.

Figure 8:
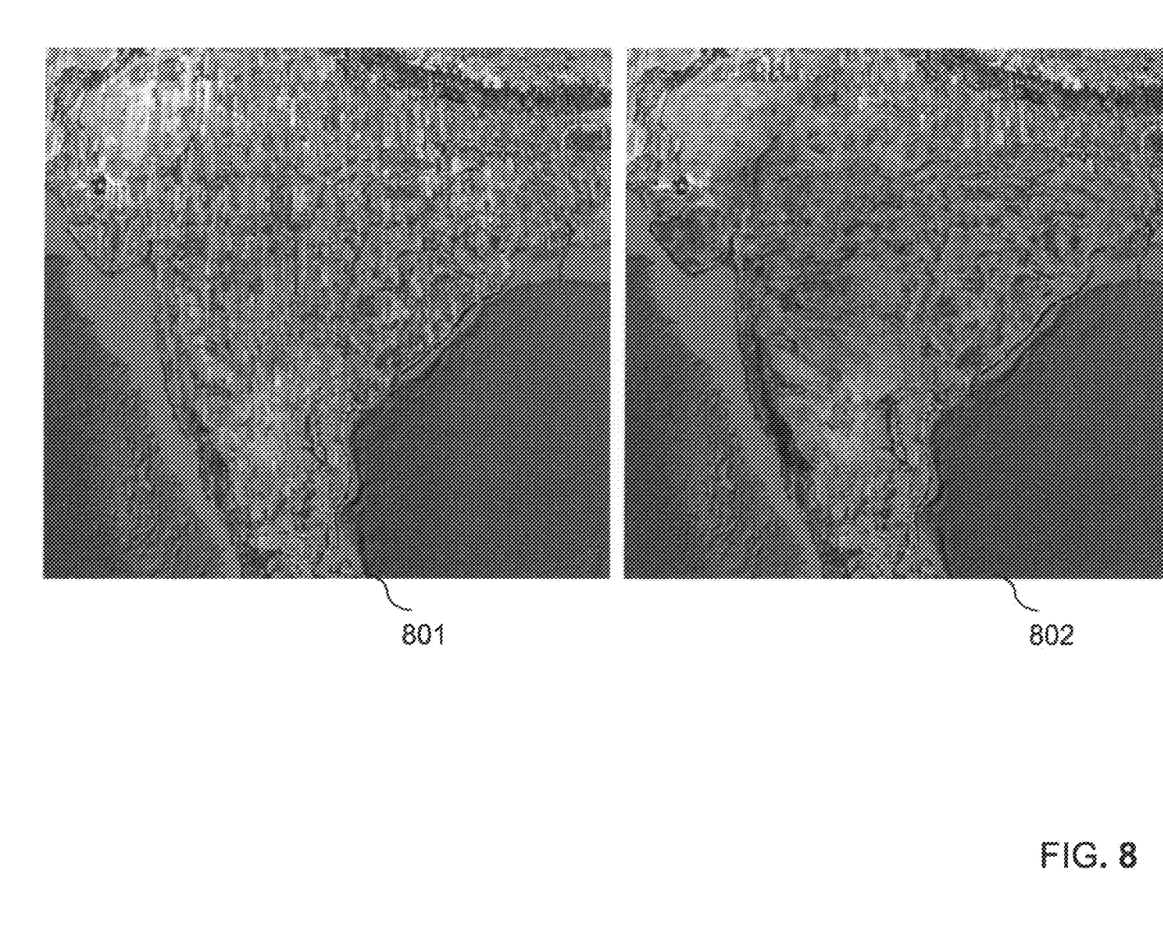
FIG. 8 illustrates example before and after images, for an application of color correction according to an embodiment of the present invention.

FIG. 8 illustrates image mosaics of the Indian subcontinent before and after being color-corrected according to an embodiment of the present invention. Mosaic 801 of uncorrected source images and the corresponding color-corrected mosaic 802 are illustrated. Color-corrected image 802 displays an improved color distribution that substantially eliminates blend artifacts, such as the vertical streaks of color visible in 801. The vertical streaks of color visible in mosaic 801 are swathes of one or more satellite images.

Figure 9:
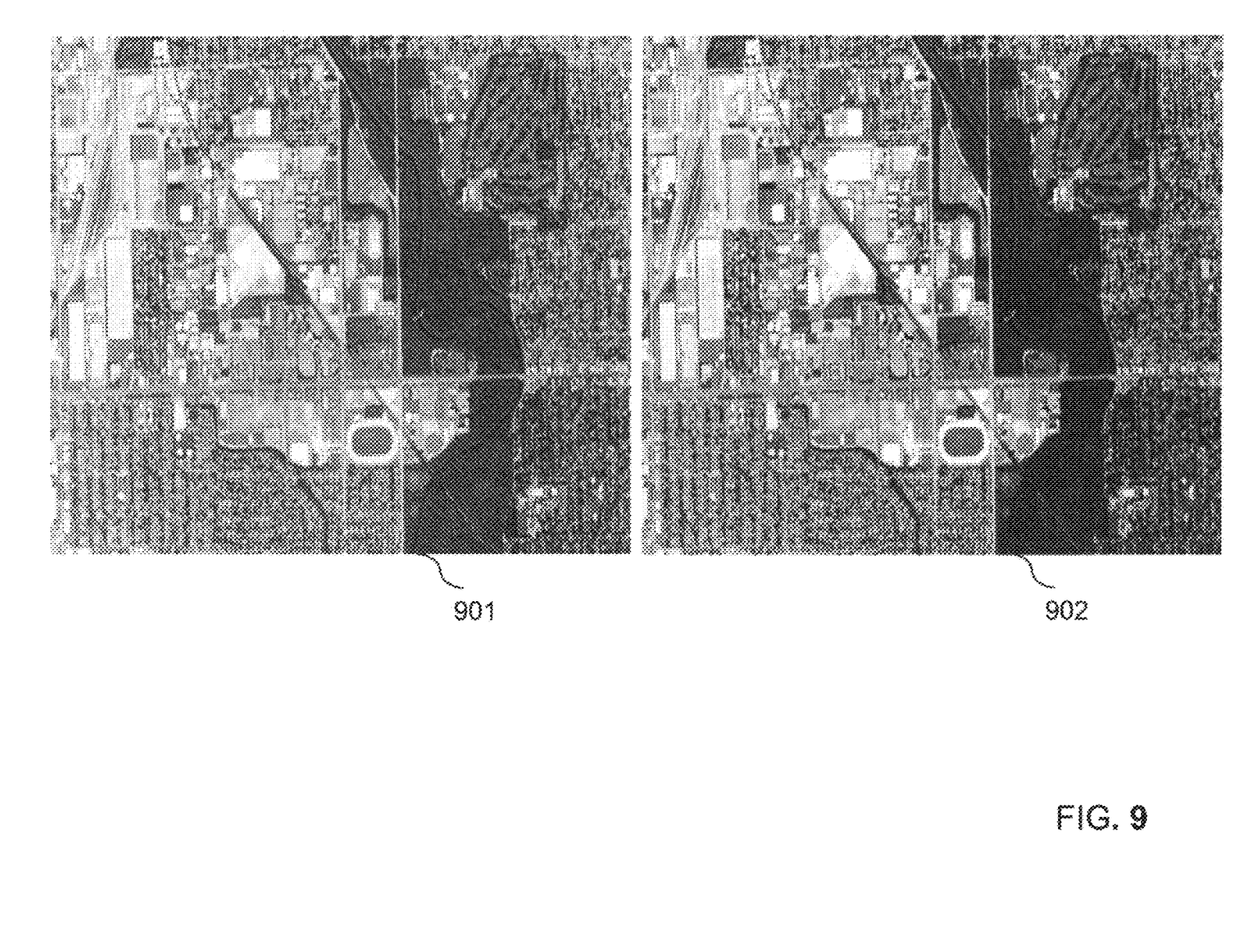
FIG. 9 illustrates example images at a relatively high zoom level, before and after an application of color correction in accordance with an embodiment of the present invention.

FIG. 9 illustrates an image mosaic of urban Chicago at a relatively high zoom level before and after being color-corrected according to an embodiment of the present invention. FIG. 9 shows that the present invention can be used at coarse levels of resolution as well as high levels of resolution without substantial side-effects such as tinting of the image, blotchiness, and the like. Mosaic 901 of uncorrected source images and the corresponding color-corrected mosaic 902 are illustrated. It can be seen in image 902 that no side-effects are visible, and the saturation and color tone is enhanced.

The description above disclosed methods and systems for creating and using a database of image statistics for updating image characteristics in mosaics of digital images. Embodiments of the present invention are described above primarily based on updating color tone characteristics of digital image mosaics. However, persons skilled in the art would understand that other aspects of digital images can be updated using embodiments of the present invention. For example, the brightness and/or contrast of images of a digital mosaic can be updated to be visually more appealing by collecting region-statistics that quantify the brightness and/or contrast of each region, and then manipulating the brightness and/or contrast of regions to be updated based on one or more other regions. Embodiments of the present invention can also be used to correct elevation mosaics with respect to height discrepancies inherent in different image acquisitions.

CONCLUSION

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for updating a mosaic of digital source images, comprising:
   (a) segmenting the mosaic to regions;
   (b) generating a plurality of region-statistics, wherein each of the plurality of region-statistics corresponds to image characteristics of a respective region;
   (c) organizing the plurality of region-statistics in a database; and
   (d) updating the mosaic using at least one target region-statistics from the organized plurality of region-statistics, wherein the updating the mosaic includes:
   determining a pixel in the mosaic to update; and
   updating the pixel based on the organized plurality of region-statistics, and wherein updating the pixel includes:
selecting at least one target region from the regions;
determining a correction from the at least one target region;
interpolating the correction from the at least one target region; and
applying the interpolated correction to the pixel,
wherein steps (a)-(d) are executed using at least one processor.

2. The method of claim 1, further comprising:
(e) optimizing the organized plurality of region-statistics, wherein the optimizing is based on one or more reference region-statistics from the organized plurality of region-statistics.

3. The method of claim 2, wherein step (e) comprises at least one of:
filtering the organized plurality of region-statistics; and
extrapolating from a first organized region-statistics to a second organized region-statistics, wherein the first and second organized region-statistics are from the organized plurality of region-statistics.

4. The method of claim 1, wherein step (c) comprises:
associating, in the database, a first organized region-statistics from the organized plurality of region-statistics with a reference region identification, wherein the reference region identification identifies a reference region.

5. The method of claim 1, wherein step (b) comprises:
determining a first region to be a reference region; and
collecting region-statistics for the first region.

6. The method of claim 5, wherein step (b) further comprises:
updating region-statistics of a second region of said regions using the region-statistics of the first region.

7. The method of claim 1, wherein the selecting is based on the distance from the pixel to the center of the at least one target region.

8. The method of claim 1, wherein the correction comprises one or more separate corrections, wherein each of the one or more separate corrections applies to a different color band.

9. The method of claim 8, wherein said each of the one or more separate corrections includes a scaling component and an offset component.

10. The method of claim 1, wherein the correction comprises a linear correction.

11. The method of claim 1, further comprising:
(f) receiving digital source images; and
(g) blending the digital source images to generate the mosaic.

12. The method of claim 1, wherein the first region-statistics and the organized region-statistics comprise color statistics.

13. A system for updating a mosaic of digital images, comprising:
at least one processor;
a memory coupled to the at least one processor; and
a region-statistics module configured to be executed by the at least one processor, the region-statistics module comprising:
a scene segmenter configured to segment the mosaic to regions;
a statistics collector configured to generate a plurality of region-statistics, wherein each of the plurality of region-statistics corresponds to image characteristics of a respective region;
a statistics organizer configured to organize the plurality of region-statistics in a database; and
a statistics updater configured to update the mosaic using at least one target region-statistics from the organized plurality of region-statistics, wherein the updating the mosaic includes:
determining a pixel in the mosaic to update; and
updating the pixel based on the organized plurality of region-statistics, and
wherein updating the pixel includes:
selecting at least one target region from the regions;
determining a correction from the at least one target region;
interpolating the correction from the at least one target region; and
applying the interpolated correction to the pixel.

14. The system of claim 13, wherein the region-statistics module further comprises:
a statistics optimizer configured to optimize the organized plurality of region-statistics based on one or more reference region-statistics from the organized plurality of region-statistics.

15. The system of claim 13, wherein the correction comprises one or more separate corrections, wherein each of the one or more separate corrections applies to a different color band.

16. The system of claim 15, wherein said each of the one or more separate corrections includes a scaling component and an offset component.

17. A tangible computer program product comprising a non-transitory computer readable medium having computer program logic recorded thereon for causing at least one processor to:
segment a mosaic of digital source images to regions;
generate a plurality of region-statistics, wherein each of the plurality of region-statistics correspond to image characteristics of a respective region;
organize the plurality of region-statistics in a database; and
update the mosaic using at least one target region-statistics from the organized plurality of region-statistics, wherein the updating the mosaic includes:
determining a pixel in the mosaic to update; and
updating the pixel based on the organized plurality of region-statistics, and
wherein updating the pixel includes:
selecting at least one target region from the regions;
determining a correction from the at least one target region;
interpolating the correction from the at least one target region; and
applying the interpolated correction to the pixel.

18. The tangible computer program product of claim 17, wherein the computer program logic further causes the at least one processor to:
optimize the organized plurality of region-statistics, wherein the optimizing is based on one or more reference region-statistics from the organized plurality of region-statistics.

19. The tangible computer program product of claim 17, wherein the correction comprises one or more separate corrections, wherein each of the one or more separate corrections applies to a different color band.

20. The tangible computer program product of claim 19, wherein said each of the one or more separate corrections includes a scaling component and an offset component.

* * * * *